(12) United States Patent
Busin et al.

(10) Patent No.: US 9,088,870 B2
(45) Date of Patent: Jul. 21, 2015

(54) METHOD AND SERVER FOR DETERMINING ASSOCIATIONS BETWEEN POOLS OF CORE NETWORK NODES AND BASE STATIONS

(75) Inventors: Åke Busin, Sollentuna (SE); Yang Zhang, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/240,823

(22) PCT Filed: Oct. 25, 2011

(86) PCT No.: PCT/SE2011/051264
§ 371 (c)(1),
(2), (4) Date: Feb. 25, 2014

(87) PCT Pub. No.: WO2013/032380
PCT Pub. Date: Mar. 7, 2013

(65) Prior Publication Data
US 2014/0206388 A1    Jul. 24, 2014

(30) Foreign Application Priority Data
Aug. 31, 2011    (SE) .................. PCT/SE2011/051042

(51) Int. Cl.
*H04W 24/00*    (2009.01)
*H04W 4/02*    (2009.01)
(Continued)

(52) U.S. Cl.
CPC .............. *H04W 4/023* (2013.01); *G01S 5/0242* (2013.01); *H04W 64/00* (2013.01)

(58) Field of Classification Search
CPC .............................. H04W 64/00; H04W 4/023
USPC ........................................ 455/456.1; 370/329
See application file for complete search history.

(56) References Cited

U.S. PATENT DOCUMENTS

2010/0080186 A1*    4/2010    Guo et al. .................... 370/329

FOREIGN PATENT DOCUMENTS

| WO | 2010003452 A1 | 1/2010 |
| WO | 2010015162 A1 | 2/2010 |
| WO | 2010132884 A1 | 11/2010 |

OTHER PUBLICATIONS

3rd Generation Partnership Project, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10)", Technical Specification, 3GPP TS 36.305 V10.0.0, Dec. 1, 2010, pp. 1-51, 3GPP, France.

(Continued)

*Primary Examiner* — Charles Shedrick
(74) *Attorney, Agent, or Firm* — Coats and Bennett, PLLC (57) ABSTRACT

The present invention relates to positioning in a communication network. In Long Term Evolution, LTE networks the positioning server E-SLMC needs routing information in order to communicate with individual base stations, eNodeBs. For LTE networks configured with one Mobility Management Entity, MME or one pool of MMEs, the routing information can be obtained by interrogating the MME or an arbitrary MME in the MME pool. However, if the network is configured with several MME pools serving different sets of eNodeBs, the E-SLMC has now knowledge of which MME or MME pool that is serving a certain eNodeB. The invention includes a method and a position server (111) configured to quickly determine which MME pool (120,130) is serving a certain eNodeB (141-153) so that the relevant routing information necessary for the positioning server (111) to communicate with the eNodeBs (141-153) is obtained.

20 Claims, 10 Drawing Sheets

(51) Int. Cl.
   *G01S 5/02*     (2010.01)
   *H04W 64/00*    (2009.01)

(56) References Cited

OTHER PUBLICATIONS

3rd Generation Partnership Project, "3rd Generation Partnership Project; Technical Specification Group Radio Access Network; Evolved Universal Terrestrial Radio Access Network (E-UTRAN); Architecture description (Release 10)", Technical Specification, 3GPP TS 36.401 V10.0.0, Dec. 1, 2010, pp. 1-19, 3GPP, France.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 9)", Technical Specification, 3GPP TS 23.401 V9.0.0, Mar. 1, 2009, pp. 1-225, 3GPP, France.

* cited by examiner

METHOD AND SERVER FOR DETERMINING ASSOCIATIONS BETWEEN POOLS OF CORE NETWORK NODES AND BASE STATIONS

TECHNICAL FIELD

The present invention relates to positioning in a communication network and especially to a method and a positioning server for determining associations between pools of core network nodes and base stations in said network.

BACKGROUND

Different telecommunication or data communication services may have different positioning accuracy requirements imposed by the application. In addition, some regulatory requirements on the positioning accuracy for basic emergency services exist in some countries, i.e. FCC E911 in the US.

In many environments, the position can be accurately estimated by using positioning methods based on GPS (Global Positioning System). Nowadays networks have also often a possibility to assist the user equipment, UE in order to improve the terminal receiver sensitivity and GPS start-up performance (such as Assisted-GPS positioning, or A-GPS). GPS or A-GPS receivers, however, may be not necessarily available in all wireless terminals. Furthermore, GPS is known to often fail in indoor environments and urban canyons. A complementary terrestrial positioning method, called Observed Time Difference of Arrival OTDOA, has therefore been standardized by 3GPP. In addition to OTDOA, the Long Term Evolution, LTE standard also specifies methods, procedures and signaling support for Enhanced Cell ID, E-CID and Assisted Global Navigation Satellite System, A-GNSS. Another method, Uplink Time Difference of Arrival, UTDOA is also under consideration for LTE.

Positioning in a LTE communication network involves a number of network elements. An overview is found in FIG. 1. The communication network 100 includes an Evolved Serving Mobile Location Center, E-SMLC 111. The E-SMLC 111 can be connected to a plurality of Mobility Management Entities, MME 121-132 in more than one MME pool 120, 130. Each MME 121-132 can serve a plurality of bases stations, also called evolved Node B, eNodeB 141-153. The eNodeBs served by an MME pool 120,130 serves terminals or user equipments, UE (not shown) in a so called MME pool area 140,150. MME pool areas 140,150 may overlap each other 160.

In the LTE positioning architecture there are three key network elements, the LCS Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or the network.

Position calculation can be conducted, for example, by a positioning server (e.g. E-SMLC in LTE) or a UE. The former approach corresponds to the UE-assisted positioning mode, whilst the latter corresponds to the UE-based positioning mode.

Figure 2:
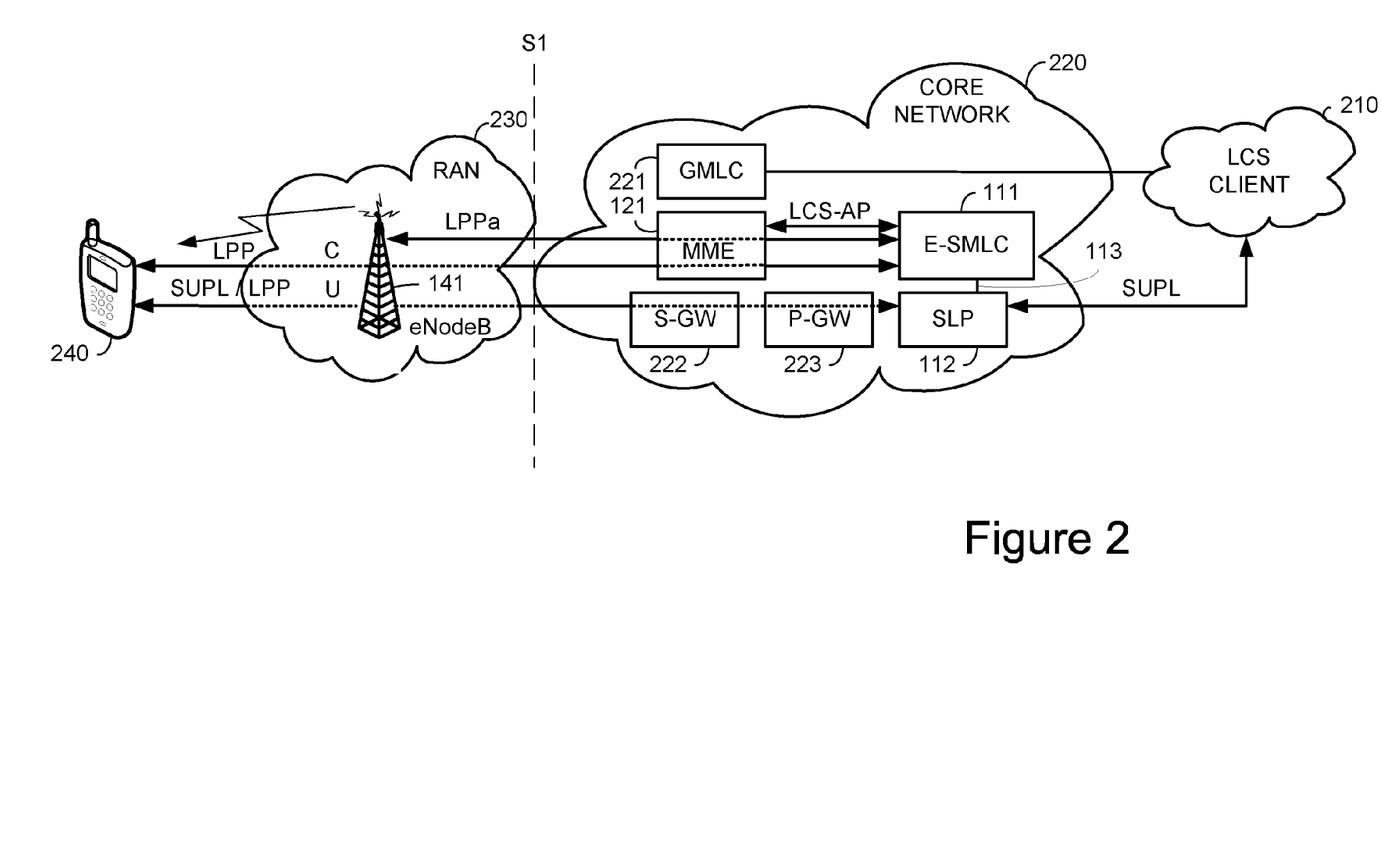
FIG. 2 is a block diagram illustrating a high-level positioning architecture in LTE.

A high-level positioning architecture, as it is currently standardized in LTE, is illustrated in FIG. 2. The LCS target is a UE 240 and the LCS Server is an E-SMLC 111 or a Secure User Plane Location Platform SLP 112. If both an E-SMLC 111 and an SLP 112 is used, the interface in between is normally a proprietary interface 113.

Two positioning protocols operating via the radio network exist in LTE, the LTE Positioning Protocols, LPP and LLP Annex, LPPa. The LPP is a point-to-point protocol between a LCS Server 111 and a LCS target device 240, used in order to position the target device 240. LPP can be used both in the user and control plane, and multiple LPP procedures are allowed in series and/or in parallel thereby reducing latency. LPPa is a protocol between eNodeB 141 and the LCS Server 111 specified only for control-plane C positioning procedures, although it still can assist user-plane positioning by querying eNodeBs for information and eNodeB measurements. The SUPL protocol is used as a transport for LPP in the user plane U. LPP has also a possibility to convey LPP extension messages inside LPP messages, e.g. to allow for operator-specific assistance data or assistance data that cannot be provided with LPP or to support other position reporting formats or new positioning methods.

Assistance data is intended to assist a UE 240 or another network node in its positioning measurements. Different sets of assistance data is typically used for different methods. The OTDOA assistance data include a number of parameters as specified in the standard 3GPP TS 36.355. For example, some parameters may be used for determining the timing relation between a Positioning Reference Signal, received in the first sub frames of the positioning occasions of two cells.

In the case of combined Control Plane/User Plane, CP/UP operation, these parameters are expected to be extracted by the E-SMLC 111 from the eNodeBs 141 via the LTE Positioning Protocol LPPa and provided to the SLP 112 via interface 113. The LPPa messages are encapsulated in Location Services Application Protocol, LCS-AP connectionless transfer procedure messages.

Furthermore, using the protocol extension LPPe there is also a possibility of carrying over a black-box data container meant for carrying vendor-/operator-specific assistance data from the eNodeB 141 via the MME 121.

For combined CP/UP operation, it is currently not possible to obtain routing information of the connectionless transfer procedures. Although LPPa is terminated between the E-SMLC 111 and the eNodeB 141, the E-SMLC 111 must contact the MME 121 having a S1 connection to the destination eNodeB 141 for connectionless transfer message delivery.

For an E-SMLC which serves one MME or one MME pool, the routing is normally not a problem because all MMEs in one MME pool can be contacted for connectionless transfer. However, if the E-SMLC 111 is connected to more than one MME pool 120,130, the mapping (i.e. the associations) between the identities of the eNodeBs 141 and the MME pool 120,130 serving the eNodeBs 141 are necessary for such routing.

One solution is to import a mapping table from an Operations Support System OSS, but this may for various reasons not be possible or feasible.

Another approach is to make a eNodeB 141 to MME pool 120,130 mapping table as an E-SMLC configuration. Such configuration is however time consuming and also subject to input/manual errors.

SUMMARY

With this background, it is the object of the present invention to obviate at least some of the disadvantages mentioned above.

The object is achieved by a method for use in a positioning server, such as an E-SMLC, for determining associations between a plurality of pools of core network nodes (e.g. MMES) and base stations (e.g. eNodeBs) comprising the steps of, for each selected base station:

calculate a probability index for each pool of core network nodes based on the location of the base station and the estimated locations of the pools;

determine the pool that is serving the base station by interrogating in descending order a core network node in at least one pool starting with the pool having the highest probability index until the serving pool has been identified;

receive from the core network node the associations between the first identified serving pool and the selected base station;

store the received associations.

With this algorithm it will be possible to optionally determining routing information from the core network node and to store this information for future use.

In one embodiment the estimates of the pool locations are preconfigured and available beforehand by the positioning server. But if that is not the case the invention also includes different options on how to estimate the pool location by recalculating the estimated pool location based on the locations of the base stations so far identified as served by the pool.

One option involves the operation to set the pool location to an average of the locations for the base stations so far identified as served by the pool. In another option the pool location is defined as a geometrical shape (such as a circle, ellipse, polygon etc) where the locations for the base stations so far identified as served by the pool are within the border of that geometrical shape.

The object of the invention is further achieved by a positioning server (e.g. an E-SMLC) for determining the associations between the pools of core network nodes (e.g. MMES) and the base stations, comprising at least one communication interface configured to be connected to at least one core network node, a storing device and a processor device connected to the communication interface and to the storing device where the processor device is configured to execute the algorithm described above.

An advantage of the invention is that the method determines the association or mapping relations between the eNodeBs and the serving MME pools so that routing information for the eNodeBs, can be extracted. With the method the rate of finding the right MME pools serving the remaining eNodeB increases dramatically for each selected eNodeB. Another advantage is that the method automatically maintains the routing/mapping information during normal traffic so the information is up-to-date. No involvement of an Operations Support System OSS or any other non-standard logical functionality is necessary which makes the solution vendor independent. No involvement of manual configuration is necessary upon changes in the MME planning. Yet another advantage is that it is possible to detect planning faults e.g. an isolated island of coverage where the eNodeB is belonging to an MME pool far away from other pools. The method can also be used for other types of mobile networks (not only LTE) where access network information/configuration needs to be extracted.

The invention will now be described in more detail and with preferred embodiments and referring to accompanying drawings.

DETAILED DESCRIPTION

Figure 1:
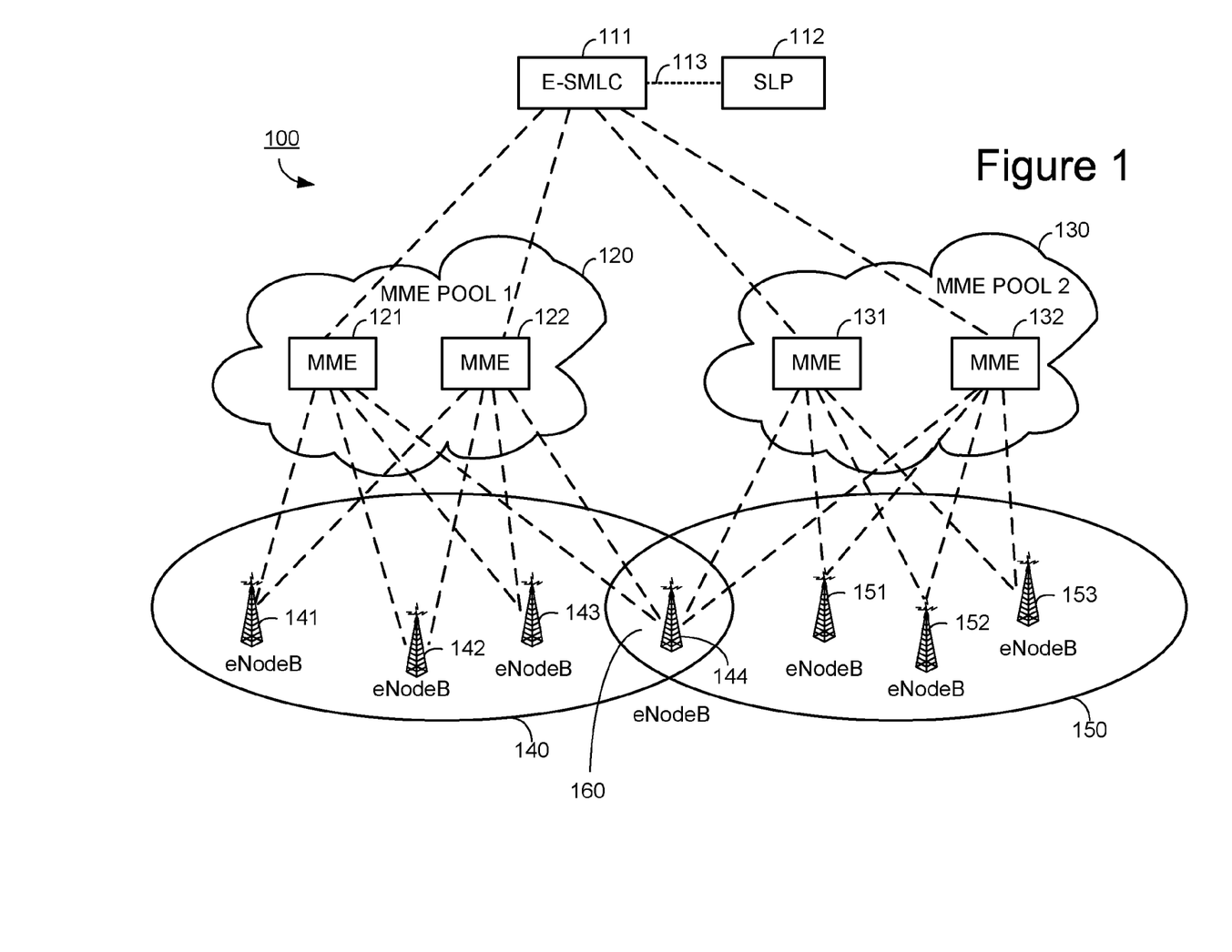
FIG. 1 is a block diagram illustrating an LTE network overview.

The invention comprises a method for determining associations or mappings between a plurality of pools 120,130 of core network nodes (such as MMEs) 121,131 and base stations (such as eNodeBs) 141,151 served by the pools 120, 130. The method can be implemented in a positioning server such as an E-SMLC 111.

An MME pool normally covers a geographically continuous area and the number of MME pools is normally limited in one mobile Public land mobile network, PLMN. The method deploys a self-learning and self-maintaining algorithm and is based on the property that two base stations (eNodeBs) and cells that are geographically close to each other most likely belong to the same MME pool.

In case the serving MME pool of a certain eNodeB is not known, the method interrogates the MME pools in a certain order where the geographically adjacent implies a higher probability of association and the number of unsuccessful interrogations is iteratively minimized.

The estimated locations of the MME pools can be preconfigured and available beforehand and can be defined as average locations of the eNodeBs served by the pool or as a geographical shape where the eNodeBs served by the pool are within the border of that geometrical shape. If the estimated MME pool locations are not known beforehand, the method also includes the optional step of estimating these locations. The definitions of the MME pool locations and how to estimate these locations are described more in detail below.

In the embodiments below it is assumed that the method is implemented in an E-SMLC 111 connected to a plurality of pools 120,130 of core network nodes, MMEs 121,131 and where the base stations are eNodeBs 141,151 served by the pools 120,130. However, the method may apply for any mobile network when access network information/configuration is needed by a node connected to the core network.

Figure 3A:
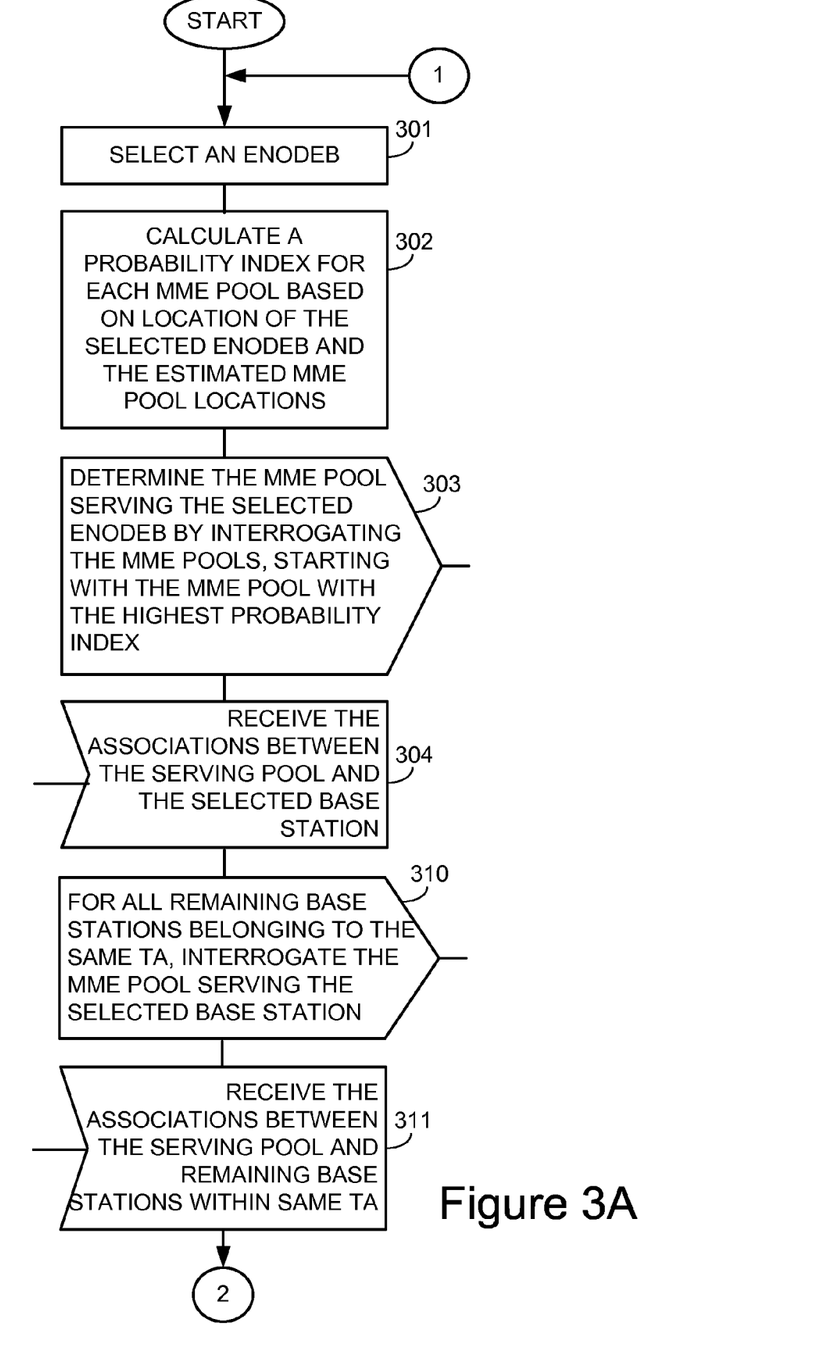
FIGS. 3A and 3B is a flow chart illustrating a method according to the present invention.
Figure 3B:
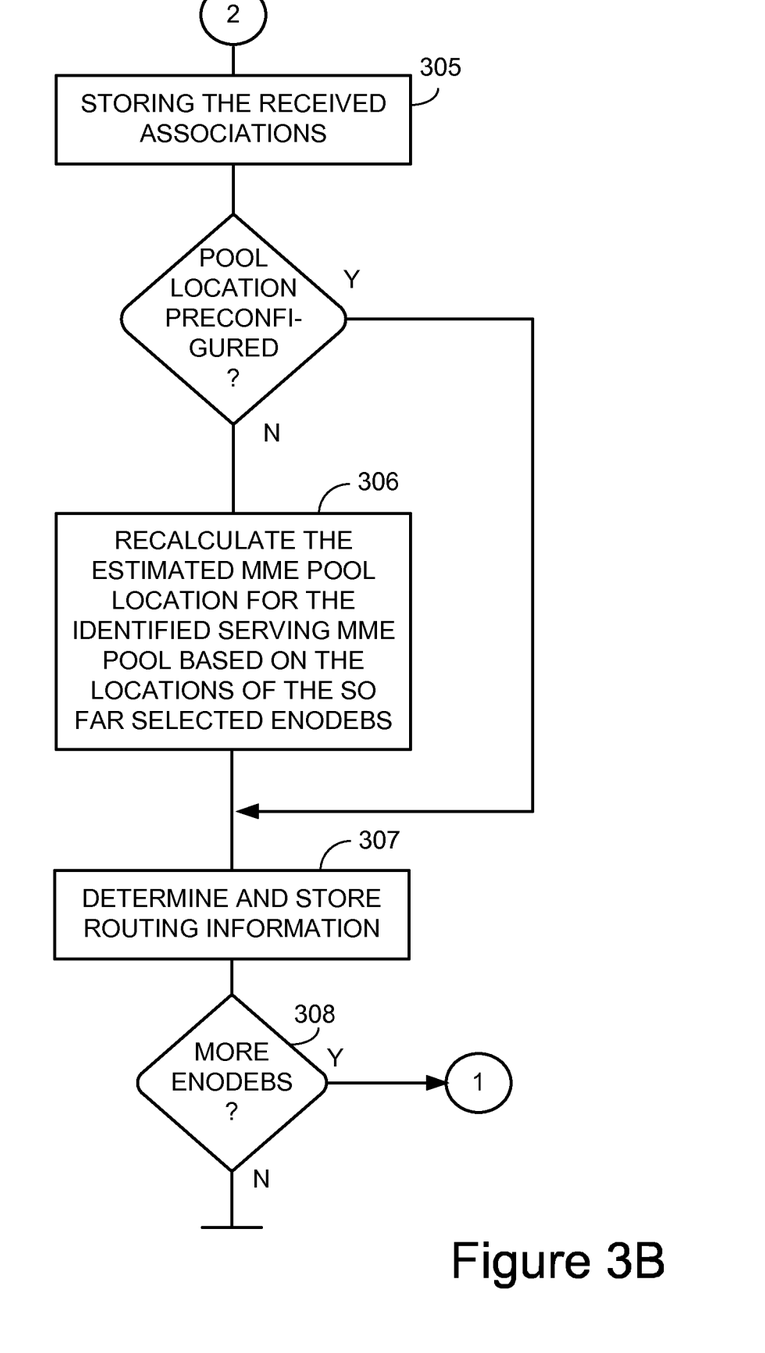

The basic method is illustrated by the flow chart in FIGS. 3A and 3B. Again, the method is based on the property that two eNodeBs that are geographically close to each other most likely belong to same MME pool. This means that if the locations of the MME pools are known it is more likely that a certain eNodeB belongs to the MME pool that is the closest. It is therefore necessary to determine the locations of the MME pools and the geographical distances between the MME pools and the eNodeB in question. Again, the E-SMLC 111 may already know the location of some MME pools beforehand but it is also possible that E-SMLC 111 does not know the locations of any MME pool at all.

Figure 5A:
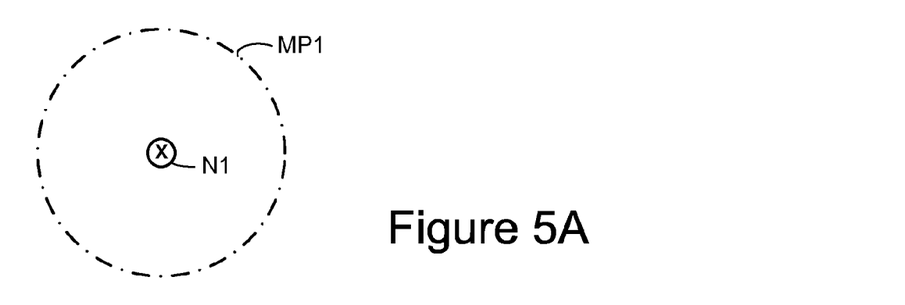
FIGS. 5A-5D, 6A-6C, 7A-7C are block diagrams illustrating a first embodiment of the present invention.

One embodiment of the basic method and how to estimate the location of the MME pools is exemplified below and illustrated by FIGS. 3A-3B, 5A-5D, 6A-6C and 7A-7C. In FIG. 5A, the E-SMLC 111 selects a first eNodeB N1 (step 301 in FIG. 3A). In the beginning, the E-SMLC 111 has no knowledge about the locations for the MME pool(s) serving N1. The E-SMLC 111 therefore interrogates an arbitrary MME pool one by one until the MME pool MP1 serving the first eNodeB N1 has been identified. Each interrogation is sent to an arbitrary MME within each MME pool. When the MME pool MP1 serving eNodeB N1 is found, the E-SMLC 111 stores the association between eNodeB N1 and MP1. The E-SMLC 111 calculates an estimated location of the serving MME pool MP1 by using the location of the eNodeB N1 (letter X inscribed in node N1). Having the associations between the eNodeB N1 and the MME pool MP1 serving eNodeB N1 it is possible to determine and store the routing information from the MME pool MP1 (step 307 in FIG. 3B).

Figure 5B:
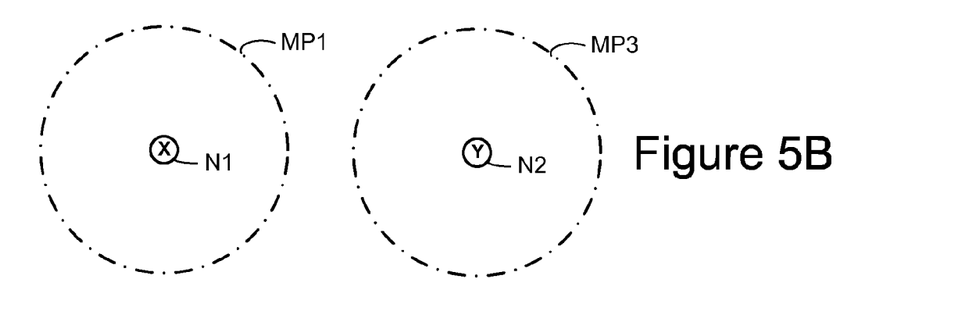

In FIG. 5B, the E-SMLC 111 selects (step 301 in FIG. 3A) a next eNodeB N2. Again, the E-SMLC 111 has no knowledge about the locations for the MME pool(s) serving eNodeB N2. E-SMLC 111 now calculates (step 302 in FIG. 3A) a probability index Pj for the MME pool(s) based on the geographical distances between eNodeB N2 and the estimated locations of the known MME pools (so far only MP1). For each MME pool j where the estimated location is not yet determined or not available the probability index Pj is set to an initial value, preferably Pj=0.

As only a probability index for MME pool MP1 is known, the E-SMLC 111 starts to interrogate (step 303 in FIG. 3A) MME pool MP1. In this example eNodeB N2 is not served by MP1. The E-SMLC 111 therefore proceeds by interrogating a next MME pool MP2 (not shown) and so on. When interrogating MME pool MP3, the MME pool serving eNodeB N2 is found. The E-SMLC 111 receives and stores the received associations (steps 304 and 305 in FIGS. 3A and 3B). As the estimated location for MP3 is not yet known, E-SMLC 111 calculates (step 306 in FIG. 3B) the estimate to be the location of eNodeB N2 (letter Y inscribed in eNodeB N2). Having the associations between the eNodeB N2 and the MME pool MP3 serving eNodeB N2 it is possible to determine and store the routing information from the MME pool MP3 (step 307).

Figure 5C:
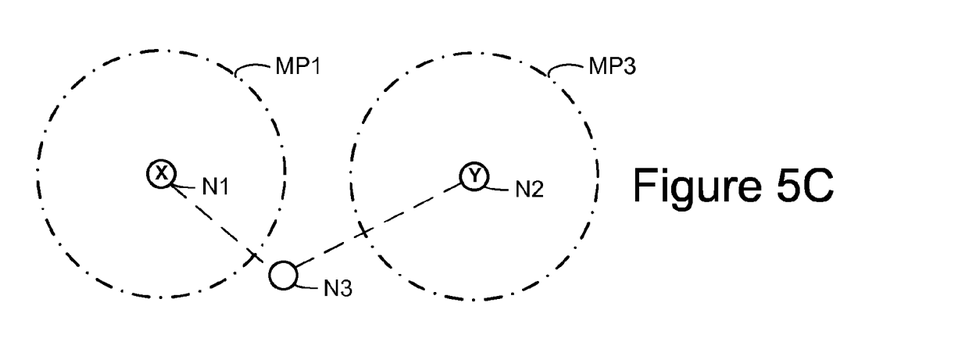

In FIG. 5C, the E-SMLC 111 selects (step 301) a next eNodeB N3. E-SMLC 111 now calculates (step 302) two probability indexes P1,P2 for N3 where the first probability index P1 is based on the distance between eNodeB N3 and the estimated location X of MME pool MP1 and the second probability index P2 is based on the distance between eNodeB N3 and the estimated location Y of MME pool MP3.

The used equations could for example be $$Pj=1/\mathrm{dist}(Gj,G\_enb)) \quad [1]$$

or $$Pj=1/\max(1,\mathrm{dist}(Gj,G\_enb)) \quad [2]$$

where dist(Gj, G_enb) is the geographical distance between the estimated MME pool location Gj and the location G_enb of the eNodeB.

The estimated MME pool location Gj is here defined as the geographical center of the MME pool j i.e. Gj=(latitude for pool j, longitude for pool j) and G_enb is defined as G_enb=(latitude for eNodeB, longitude for eNodeB). Gj is calculated as an average of the locations G_enb of the eNodeBs so far identified as served by the MME pool.

A new average value Gj_new can be calculated as $$Gj\_new=(Gj\_old*N+G\_enb)/(N+1) \quad [3]$$

where Gj_old is the value from the latest earlier calculation and N is the number of eNodeBs so far identified as served by MME pool j excluding the lastest eNodeB. An initial value of Gj_old can be set to the value of the location for the first identified eNodeB that is served by MME pool j. G_enb for each eNodeB can for example be obtained and stored beforehand from an Operations, Administration and Maintenance, OAM entity in the network.

When calculating the probability index Pj, equation [2] above is preferred because it covers some extreme cases and limits the value range of Pj to a value between 0 and 1. Using equation [2] the first probability index P1 will therefore have the value P1=1/max(1, dist(X, N3)) and the second probability index P2 will have the value P2=1/max(1, dist (Y, N3).

Figure 5D:
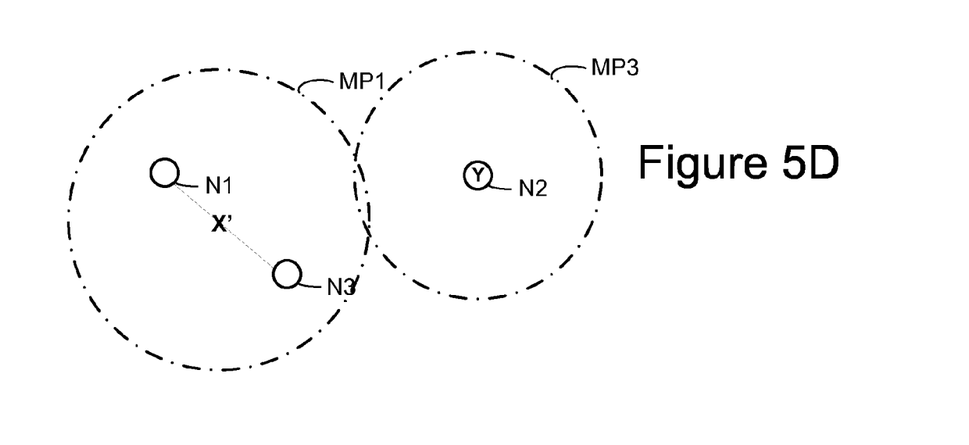
Figure 6A:
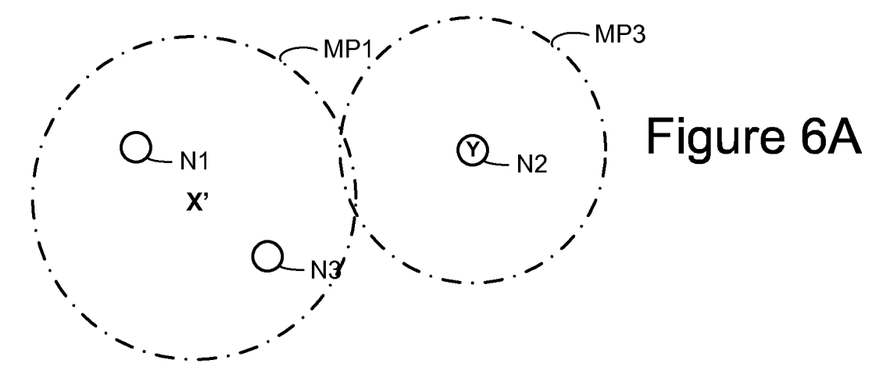

As the distance between X and eNodeB N3 is the shortest, the first probability index P1 is highest and the E-SMLC 111 starts to interrogate (step 303) MME pool MP1. In this case it is again MME pool MP1 that is serving eNodeB N3, and the E-SMLC 111 receives (step 304) from an MME in the MME pool MP1 and stores (step 305) the associations between eNodeB N3 and MP1 and recalculates (step 306) the estimated location of MP1 based on both the location of eNodeB N1 and eNodeB N3. In FIGS. 5D and 6A this new estimated location is marked with the letter X' between eNodeB N1 and eNodeB N3. The recalculated location is a 'mean value' of the location of eNodeB N1 and the location of eNodeB N3. Having the associations between the eNodeB N3 and the MME pool MP1 serving eNodeB N3 it is also possible to determine and store the routing information from the MME pool MP1 (step 307).

Figure 6B:
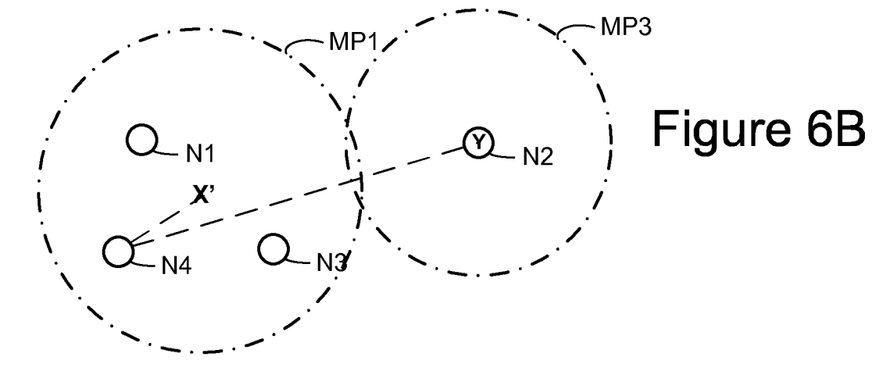
Figure 6C:
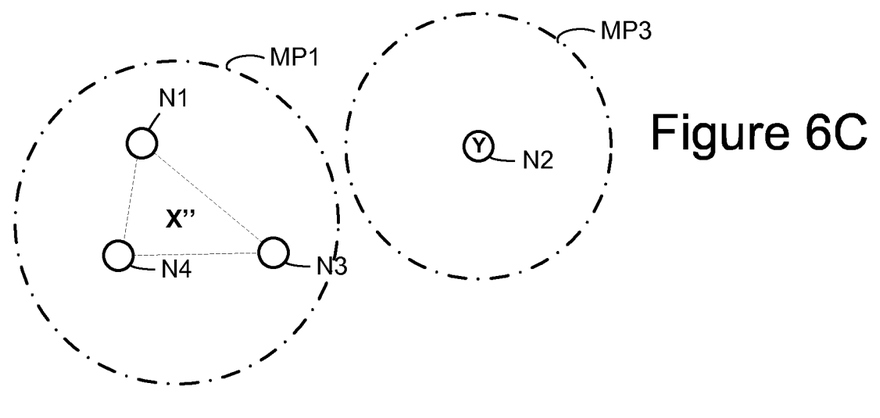

As more eNodeBs remain (step 308), the E-SMLC 111 selects (step 301) a next eNodeB N4 as illustrated in FIG. 6B. E-SMLC 111 again calculates (step 302) two probability indexes P1,P2 where the first probability index P1 is based on the distance between eNodeB N4 and the estimated location X' of MP1 and the second probability index P2 is based on the distance between eNodeB N4 and the estimated location Y of MP3. As the distance between eNodeB N4 and MP1 is the shortest, the first probability index is highest and the E-SMLC 111 starts to interrogate (step 303) MME pool MP1. In this case it is again determined (step 304) that MME pool MP1 is serving eNodeB N4. The E-SMLC 111 stores (step 305) the associations between eNodeB N4 and MME pool MP1 and recalculates (step 306) the estimated location of MME pool MP1 based on the location of the three eNodeB N1, N3 and N4. In FIG. 6C this new estimated location is marked with the letter X" as an average location of the locations for the eNodeBs N1, N3 and N3. Having the associations between the eNodeB N4 and the MME pool MP1 serving eNodeB N4 it is also possible to determine and store the routing information from the MME pool MP1 (step 307).

Figure 7A:
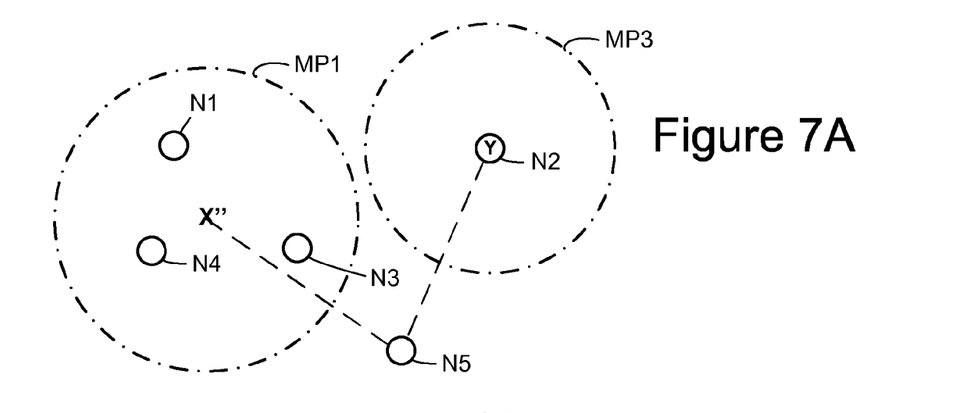
Figure 7B:
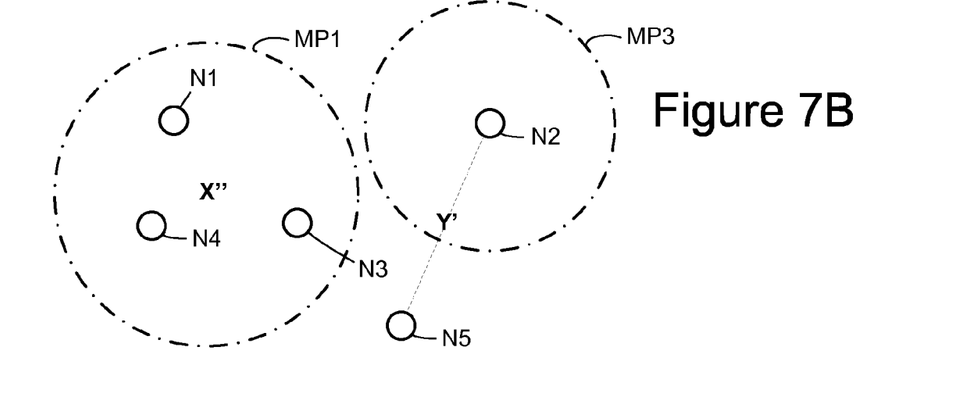
Figure 7C:
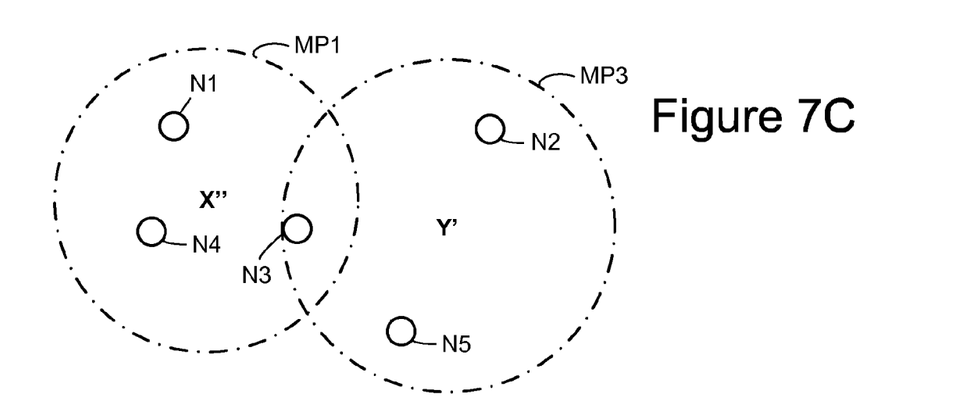

In FIG. 7A, the E-SMLC 111 selects (step 301) a next eNodeB N5. E-SMLC 111 again calculates (step 302) two probability indexes P1,P2 now for N5 where the first probability index P1 is based on the distance between N5 and the estimated location of MP1 X" and the second probability index P2 is based on the distance between N5 and the estimated location Y of MP3. As the distance between N5 and Y is the shortest, the second probability index P2 is highest and the E-SMLC 111 starts to interrogate (step 303) MME pool MP3. In this case it is determined (step 304) that MME pool MP3 is serving eNodeB N5. The E-SMLC 111 stores (step 305) the associations between eNodeB N5 and MME pool MP3 and recalculates (step 306) the estimated location of MP3 based on the location of the two eNodeB N2 and N5. In FIGS. 7B and 7C this new estimated location is marked with the letter 'Y' between eNodeB N2 and N5 as a 'mean value' of the location of eNodeB N2 and the location of eNodeB N5.

If more eNodeBs exist, the algorithm carries on calculating new probability indexes and updating the location estimates for the MME pools serving the existing and remaining eNodeBs.

Figure 8A:
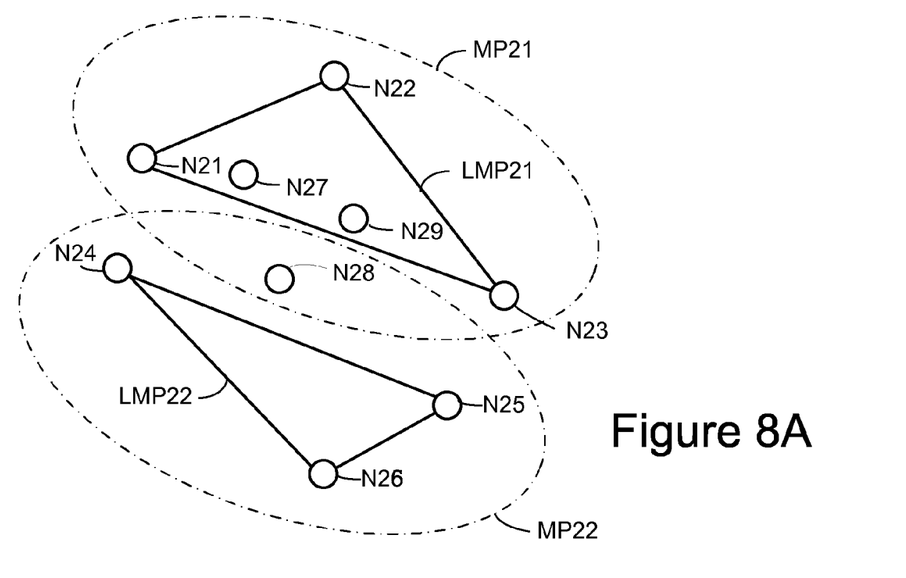
FIGS. 8A-8B, 9 are block diagrams illustrating a second embodiment of the present invention.
Figure 8B:
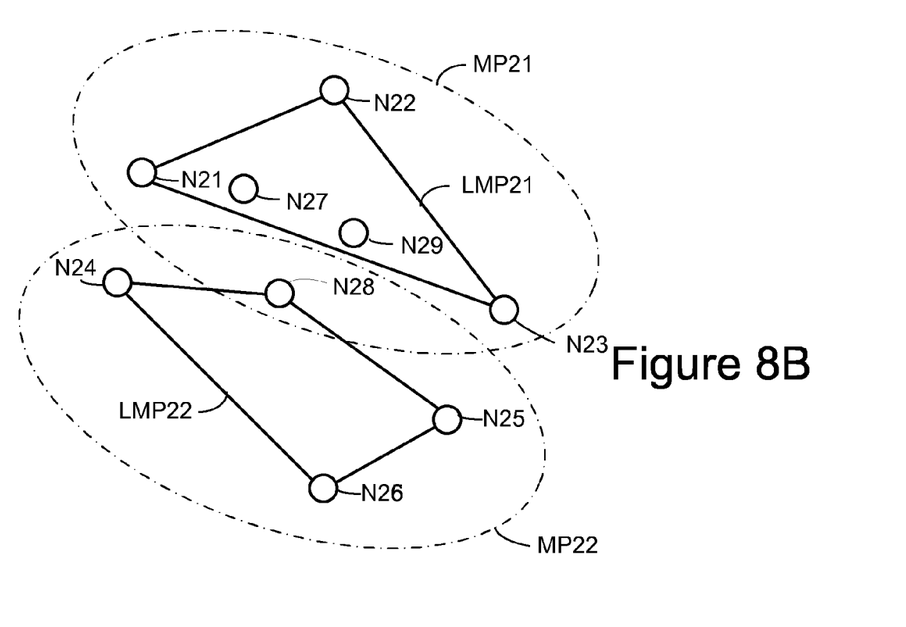
Figure 9:
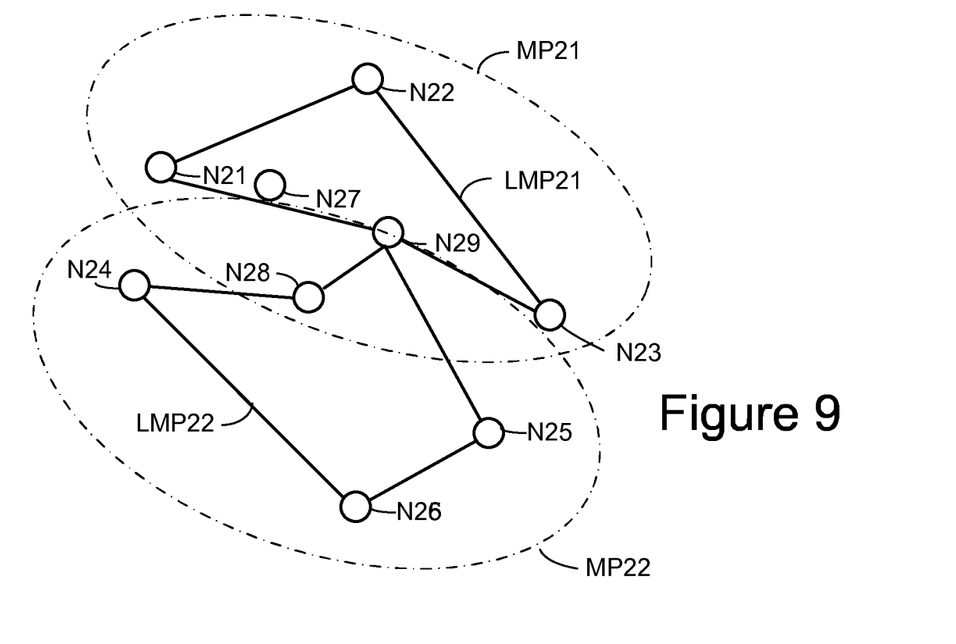

An alternative embodiment of how the algorithm is applied is illustrated by FIGS. 8A, 8B and 9. In FIG. 8A it is assumed that already two MME pools MP21, MP22 serving six eNodeB N21-N26 have been determined. In this embodiment the location of each MME pool MP21, MP22 is defined as a geometrical shape. This shape could be a circle, an ellipse a polygon or some other geographical shape where the locations for the eNodeBs so far identified as served by the pool are within the border of that geometrical shape. The border can optionally be defined as circumscribing the served eNodeBs with a minimum distance between the border and the location for each eNodeB. The minimum distance can for example be a few hundred meters in order to include the coverage radius of each eNodeB.

In FIGS. 8A, 8B and 9 the geometrical shapes are two location polygons LMP21, LMP22 where the eNodeBs served by the MME pool form the vertices of that polygon. When selecting (step 301) an eNodeB N27 the calculation (step 302) of the probability index Pj for each MME pool M21 and MP22 uses the equation $$Pj = \text{inside}(Sj, G\_enb) \qquad [4]$$

where inside(Sj, G_enb) is a mathematical operator indicating if the location G_enb of the selected eNodeB is within the border Sj of the location polygon j or not. The probability index Pj has here a binary value, 0 or 1. For eNodeB N27 the location G_enb is within the polygon LMP21, but not within LMP22. The probability index P1 for MME pool M21 is therefore P1=1 and the probability index P2 for MME pool M22 is P2=0. The interrogation (step 303) of which MME pool that is serving eNodeB N27 therefore starts with MME pool M21. If it is determined (step 304) that MME pool M21 actually serves eNodeB N27, and as eNodeB N27 already is within the polygon LMP21, no recalculation of the polygon is necessary.

When selecting (step 301) an eNodeB N28 the same calculation is used. As eNodeB N28 is not within any polygon at all the probability indexes P1 and P2 are both P1=0, P2=0. In this situation, the equation [1] or [2] described above can be used in addition to equation [4]. If it is determined (steps 303 and 304) that eNodeB N28 is served by MME pool MP22 the border Sj of the location polygon LMP22 for that pool MP22 is recalculated (step 306) by adding eNodeB N28 as a new vertex to the polygon as can be seen from FIG. 8B.

When selecting an eNodeB N29 the same calculation is used again and new probability indexes P1 and P2 are calculated. For eNodeB N29 the result is P1=1, P2=0 so the interrogation of which MME pool that is serving eNodeB N29 starts with MME pool M21. In this case it is however determined that it is MME pool MP22 that is serving eNodeB N29. The border for location polygon LMP22 for MME pool MP22 is therefore recalculated by adding eNodeB N29 as a new vertex but the border of location polygon LMP21 is also recalculated by excluding eNodeB N29. This is illustrated in FIG. 9.

Again, if more eNodeBs exist, the algorithm carries on calculating new probability indexes and recalculating the shape of the location polygons for the MME pools serving the existing and remaining eNodeBs.

In yet another embodiment, the calculation of the probability index Pj for MME pool j is using the equation $$Pj = 1/\max(1, Dj) \qquad [5]$$

Where the Dj is defined as the geographical distance between the location G_enb of the selected eNodeB and the location G_cej of the eNodeB already identified to be served by MME pool j and that is closest to the selected eNodeB.

If the Tracking Area Code, TAC i.e. the identity of the tracking area, TA to which the eNodeB belongs is known by the E-SMLC 111, the algorithms described above can optionally be enhanced.

According to LTE standards, all eNodeBs that belong to the same tracking area are also served by the same MME pool. This means that as soon as an MME pool is determined for a selected eNodeB, the E-SMLC 111 can interrogate (in step 310 in FIG. 3A) the same MME pool and receive (in step 311) for each eNodeB known to belong to the same TA the associations between these eNodeBs and the MME pool which then are stored (in step 305). The location information for all these eNodeBs can also be used to recalculate the estimated MME pool location (step 206).

For all embodiments of the method it is also possible to run the algorithm in parallel for different eNodeBs.

Figure 4:
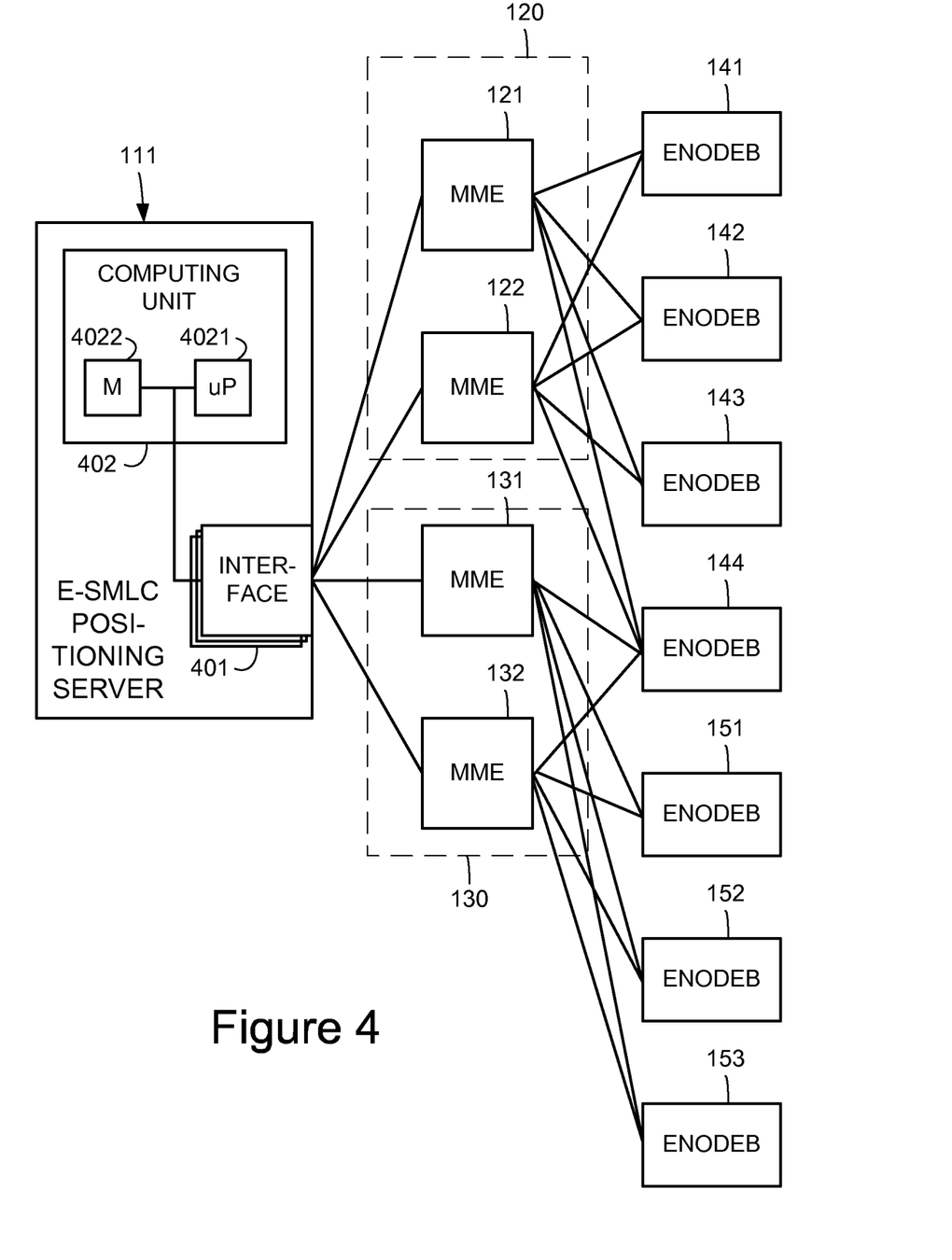
FIG. 4 is a block diagram illustrating a positioning server according to the present invention.

An embodiment of a positioning server 111 according to the present invention is illustrated in FIG. 4. The positioning server is here an E-SMLC 111 located in a core network. The E-SMLC 111 comprises at least one communication interface 401 where one or several interfaces 401 are configured to be connected to MMEs 121,131 in at least one pool 120,130 of MMEs 121,131 in the core network. Each MME pool 120, 130 is connected to and serving at least one base station, eNodeB 141-153 in the radio access network. The E-SMLC 111 also comprises a computing unit 402 including a storing device 4022 for storing among others the determined associations and MME pool locations and a processor device 4021 connected to the communication interface 401 and to the storing device 4022.

The processor device 4021 is configured to execute the algorithms described above and illustrated for example by the flow chart in FIGS. 3A and 3B. That is, to select in step 301 an eNodeB 141 and to calculate in step 302 a probability index Pj for each MME pool 120,130 based on the location G_enb of the selected eNodeB 141 and the estimated locations Gj of the MME pools 120,130. The probability indexes can be calculated according to any of the equations [1]-[3] or [5] described above. The processor device 4021 is further configured to determine in step 303 the MME pool 120 that is serving the selected eNodeB 141 by interrogating in descending order an MME 121 in at least one MME pool 120 starting with the MME pool 120 having the highest probability index Pj until the serving MME pool 120 has been identified. The processor device 4021 is further configured to receive in step 304 from the MME 121 the associations between the first identified serving MME pool 120 and the selected eNodeB 141 and to store in step 305 the received associations in the storing device 4022. The processor device 4021 is further configured to recalculate in step 306 the estimated pool location Gj of the first identified serving MME pool 120 based on the locations G_enb of the eNodeB 141 so far identified as served by the pool 120 and to repeat the above listed steps for each remaining eNodeB 142-153.

The positioning server 111 can also be further configured to determine routing information from the MMEs 121,131 in the MME pools 120,130 and to store that routing information in the storing device 4022.

The invention claimed is:
1. A method, in a positioning server in a communication network, for determining associations between a plurality of pools of core network nodes and base stations served by the pools, the method comprising:
- selecting a base station;
- calculating a probability index (Pj) for each pool based on a location of the selected base station and estimated locations of the pools;
- determining the pool that is serving the selected base station by interrogating, in descending order, a core network node in at least one pool starting with a pool having the highest probability index, until a serving pool has been identified;
- receiving, from the interrogated core network node, associations between the corresponding identified serving pool and the selected base station;
- storing the received associations;
- repeating the selecting, calculating, determining, receiving, and storing for each remaining base station.

2. The method of claim 1, further comprising recalculating the estimated pool location of the identified serving pool based on locations of the base stations so far identified as served by the identified serving pool.

3. The method of claim 2, wherein the recalculating comprises setting the estimated pool location to an average of locations of the base stations so far identified as served by the identified serving pool.

4. The method of claim 2:
- wherein the estimated pool location is defined as a geometrical shape having a border;
- wherein the recalculating the estimated pool location comprises amending the border of the geometrical shape to include, within the border, the locations of the base stations so far identified as served by the pool;
- wherein the probability index is calculated according to the equation:
  - Pj=inside(Sj, G_enb), where inside(Sj, G_enb) is a mathematical operation indicating if the location of the selected base station is within the border or not.

5. The method of claim 1, wherein the probability index is calculated according to the equation Pj=1/max(1, dist(Gj, G_enb)), where dist(Gj, G_enb) is a geographical distance between the estimated pool location and the location of the selected base station.

6. The method of claim 1, wherein the probability index is calculated according to the equation Pj=1/max(1, Dj), where (Dj) is a geographical distance between the location of the selected base station and a location of a base station that is both already identified to be served by the pool and closest to the selected base station.

7. The method of claim 1:
- wherein the estimated pool location is defined as a geometrical shape having a border where locations of base stations so far identified as served by the pool are within the border;
- wherein the probability index has a binary value calculated according to the equation:
  - Pj=inside(Sj, G_enb), where inside(Sj, G_enb) is a mathematical operation indicating if the location (G_enb) of the selected base station is within the border or not.

8. The method of claim 1, further comprising determining and storing routing information from the core network node to enable the positioning server to communicate with the selected base station via the core network node.

9. The method of claim 1, further comprising, prior to the storing the received associations:
- for all remaining base stations belonging to the same tracking area (TA) as the selected base station, determining associations between the identified serving pool and the remaining base stations belonging to the same TA by interrogating the core network node;
- receiving, from the core network node, associations between the identified serving pool and the remaining base stations belonging to the same TA as the selected base station.

10. The method of claim 1, wherein the positioning server is an Evolved Serving Mobile Location Center (E-SMLC).

11. The method of claim 1, wherein:
- the core network node is a Mobility Management Entity (MME);
- the base station is a Long Term Evolution evolved Node B (eNodeB).

12. A positioning server in a communication network for determining associations between a plurality of pools of core network nodes and base stations served by the pools, the positioning server comprising:
- at least one communication interface configured to be connected to at least one core network node;
- a storing device for storing the associations;
- a processing circuit connected to the communication interface and to the storing device and configured to:
  - select a base station;
  - calculate a probability index (Pj) for each pool based on a location of the selected base station and estimated locations of the pools;
  - determine a pool that is serving the selected base station by interrogating, in descending order, a core network node in at least one pool starting with a pool having the highest probability index, until a serving pool has been identified;
  - receive, from the interrogated core network node, associations between the corresponding identified serving pool and the selected base station;
  - store the received associations;
  - repeat the selecting, calculating, determining, receiving, and storing for each remaining base station.

13. The positioning server of claim 12, wherein the processing circuit is configured to recalculate the estimated pool location of the identified serving pool based on locations of the base stations so far identified as served by the pool.

14. The positioning server of claim 13, wherein the processing circuit is configured to recalculate the estimated pool location as an average of locations of the base stations so far identified as served by the identified serving pool.

15. The positioning server of claim 13:
- wherein the estimated pool location is defined as a geometrical shape having a border;
- wherein the processing circuit is configured to:
  - recalculate the estimated pool location by amending the border to include within the border the locations of the base stations so far identified as served by the identified serving pool;
  - calculate the probability index according to the equation:
    - Pj=inside(Sj, G_enb), where inside(Sj, G_enb) is a mathematical operation indicating if the location of the selected base station is within the border or not.

16. The positioning server of claim 12, wherein the processing circuit is configured to calculate the probability index according to the equation Pj=1/max(1, dist(Gj, G_enb)), where dist(Gj, G_enb) is a geographical distance between the estimated pool location and the location of the selected base station.

17. The positioning server of claim 12, wherein the processing circuit is configured to calculate the probability index according to the equation $P_j=1/\max(1, D_j)$, where ($D_j$) is a geographical distance between the location of the selected base station and a location of a base station that is both already identified to be served by the pool and closest to the selected base station.

18. The positioning server of claim 12:
- wherein the estimated pool location is defined as a geometrical shape having a border;
- wherein the processing circuit is configured to calculate the probability index according to the equation: $P_j=\text{inside}(S_j, G\_enb)$, where inside($S_j$, $G\_enb$) is a mathematical operation indicating if the location ($G\_enb$) of the selected base station is within the border or not.

19. The positioning server of claim 12, wherein the processing circuit is configured to determine routing information from the core network node and to cause the routing information to be stored in the storing device.

20. The positioning server of claim 12:
- wherein the positioning server is Evolved Serving Mobile Location Center (E-SMLC);
- wherein the interface is configured to be connected to at least one Mobility Management Entity (MME).

\* \* \* \* \*